United States Patent
Gausepohl et al.

(10) Patent No.: US 8,619,413 B2
(45) Date of Patent: Dec. 31, 2013

(54) PARTIALLY COMPOUND-FILLED POWER SUPPLY UNIT AND MANUFACTURING METHOD

(75) Inventors: Heinz-Jürgen Gausepohl, Münster (DE); Taner Yilmaz, Münster (DE)

(73) Assignee: FRIWO Gerätebau GmbH, Ostbevern (DE)

( * ) Notice: Subject to any disclaimer, the term of this patent is extended or adjusted under 35 U.S.C. 154(b) by 212 days.

(21) Appl. No.: 13/303,509

(22) Filed: Nov. 23, 2011

(65) Prior Publication Data

US 2012/0134076 A1 May 31, 2012

(30) Foreign Application Priority Data

Nov. 26, 2010 (DE) .......................... 10 2010 052 728

(51) Int. Cl.
*H02B 1/32* (2006.01)
*H05K 3/00* (2006.01)
(52) U.S. Cl.
USPC ........... 361/623; 361/601; 361/622; 361/636; 361/679.01; 174/50; 174/50.52; 174/50.5; 174/520; 174/521; 363/141; 363/146; 439/74; 439/131; 439/146; 439/76.1
(58) Field of Classification Search
USPC ......... 361/601, 622, 623, 636, 705, 710, 715, 361/728, 752, 760, 761, 772, 773; 174/50, 174/50.52, 50.5, 520, 521; 363/141–146; 439/74, 76.1, 131, 146, 171, 172, 173, 439/447, 620.21, 620.22, 695; 29/825, 830, 29/832, 592.1, 602.1; 336/92, 107, 192, 336/198, 200, 232; 312/223.2
See application file for complete search history.

(56) References Cited

U.S. PATENT DOCUMENTS 3,403,366 A * 9/1968 Klatte et al. .................... 336/92
3,711,806 A * 1/1973 Flentge ........................... 336/92
(Continued)

FOREIGN PATENT DOCUMENTS

DE     4227629     2/1994
EP     0735634     10/1996
(Continued)

OTHER PUBLICATIONS

Xinbo Ruan et al., "Fundamental Considerations of Three-Level DC-DC Converters: Topologies, Analyses, and Control" IEEE Transactions on Circuits and Systems-I: Regular Papers, Dec. 2008 (11 pages).

(Continued)

*Primary Examiner* — Michail V Datskovskiy
(74) *Attorney, Agent, or Firm* — Michael Best & Friedrich LLP

(57) ABSTRACT

A power supply unit is provided for supplying low voltage power. The supply unit includes at least one power plug contact connectable to a supply voltage; at least one output lead for outputting the low voltage; and a voltage transformer unit having at least one electronic component for transforming the supply voltage to the low voltage. The power supply unit includes a casing made of a casing base element and a lid element, such that the power plug contact is held in the casing base element or in the lid element in such a way that it can be plugged into a power socket. The voltage transformer unit is mounted on a circuit carrier which is arranged in the casing base element in such a way that a defined first region of the circuit carrier is received in a casting space filled with an electrically insulating casting compound.

15 Claims, 5 Drawing Sheets

(56) References Cited

U.S. PATENT DOCUMENTS

| | | | |
|---|---|---|---|
| 4,086,643 A * | 4/1978 | Jacobs | 361/92 |
| 4,107,636 A * | 8/1978 | DiGirolamo | 336/92 |
| 4,519,015 A * | 5/1985 | Lin | 361/752 |
| 4,899,256 A * | 2/1990 | Sway-Tin | 361/715 |
| 5,079,672 A * | 1/1992 | Haubner et al. | 361/705 |
| 5,744,934 A * | 4/1998 | Wu | 320/111 |
| 6,644,984 B2 * | 11/2003 | Vista et al. | 439/76.1 |
| 6,851,955 B2 * | 2/2005 | Chen | 439/76.1 |
| 7,002,808 B2 * | 2/2006 | Lim et al. | 361/752 |
| 7,344,385 B2 * | 3/2008 | Chen | 439/74 |
| 7,499,301 B2 * | 3/2009 | Zhou | 363/146 |
| 7,563,139 B1 | 7/2009 | Wang | 439/638 |
| 7,789,696 B2 * | 9/2010 | Umei et al. | 439/447 |
| 7,862,380 B1 * | 1/2011 | Wang | 439/620.22 |
| 7,885,076 B2 * | 2/2011 | Sharifipour et al. | 361/707 |
| 7,978,489 B1 * | 7/2011 | Telefus et al. | 363/146 |
| 7,983,064 B2 * | 7/2011 | Zhang et al. | 363/146 |
| 8,047,873 B1 * | 11/2011 | Wang | 439/589 |
| 8,337,250 B1 * | 12/2012 | Yang | 439/620.22 |
| 8,342,861 B2 * | 1/2013 | Stiehl et al. | 439/76.1 |
| 2003/0153200 A1 * | 8/2003 | Vista et al. | 439/76.1 |
| 2004/0008532 A1 | 1/2004 | Asawa | |
| 2004/0075989 A1 * | 4/2004 | Wong | 361/752 |
| 2004/0110397 A1 * | 6/2004 | Chen | 439/75 |
| 2009/0289596 A1 * | 11/2009 | McGinley et al. | 320/111 |

FOREIGN PATENT DOCUMENTS

| | | |
|---|---|---|
| JP | 2004265748 | 9/2004 |
| JP | 2005086116 | 3/2005 |

OTHER PUBLICATIONS

Wuhua Li et al., "A Review of Non-Isolated High Step-Up DC/DC Converters in Renewable Energy Applications" College of Electrical Engineering, Zhejiang University, 2009 (6 pages).

German Office Action for Application No. 102010052728.9 dated Nov. 4, 2011 (5 pages).

* cited by examiner

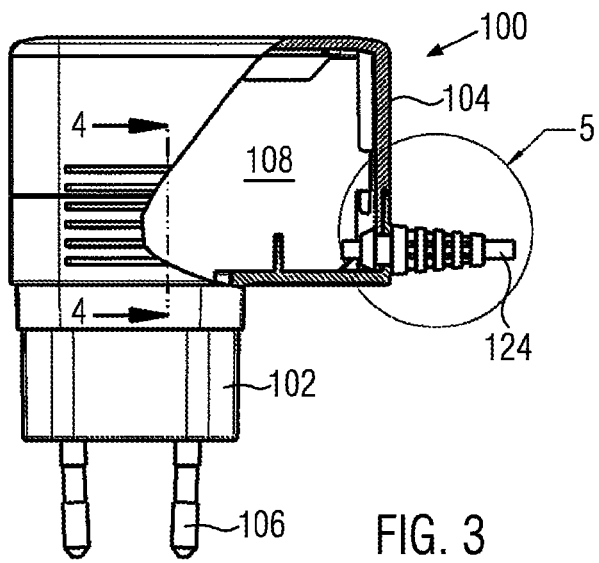
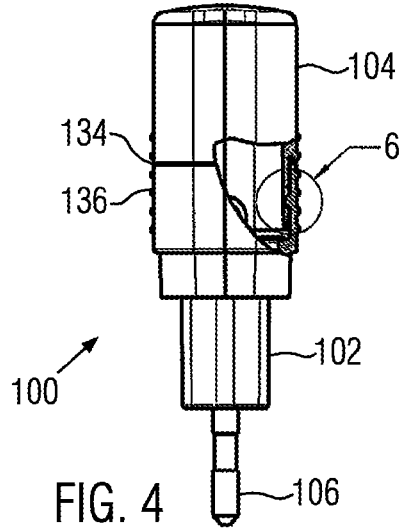
FIG. 3   FIG. 4
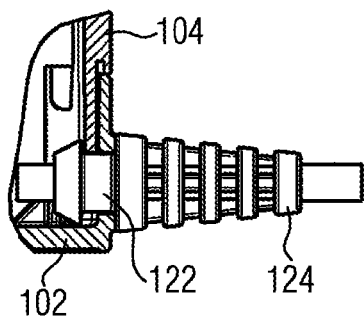 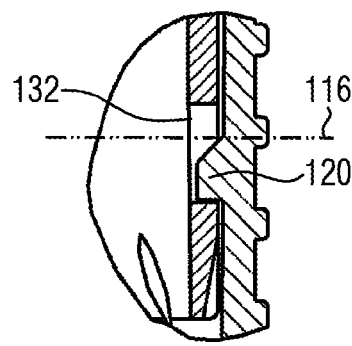
FIG. 5   FIG. 6
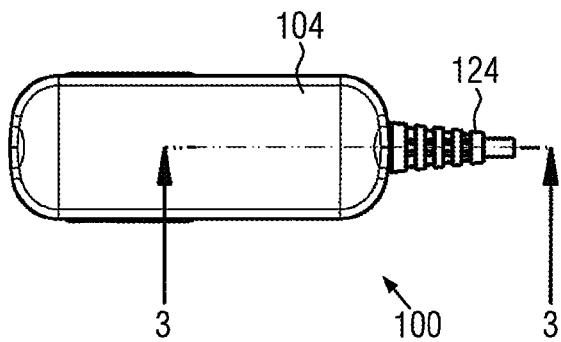
FIG. 7

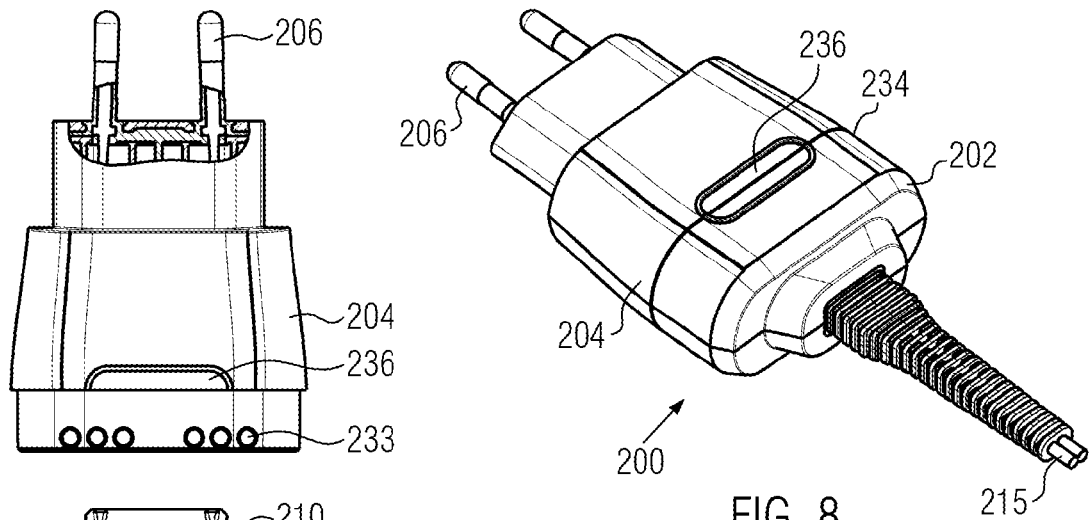
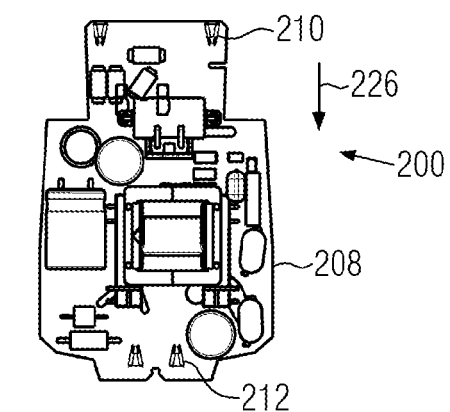
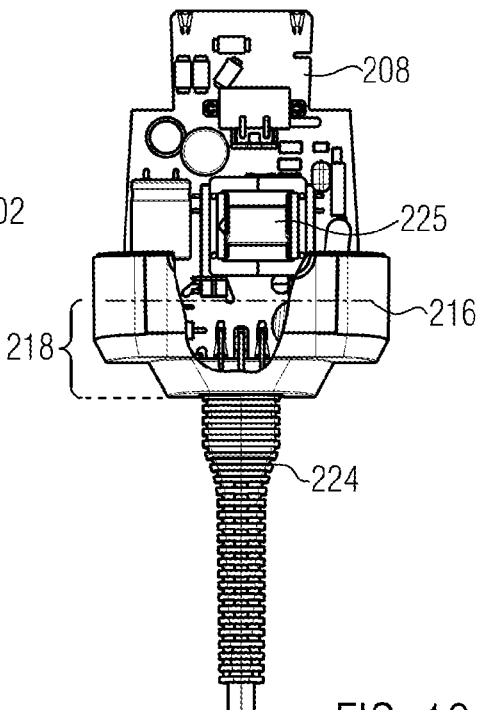
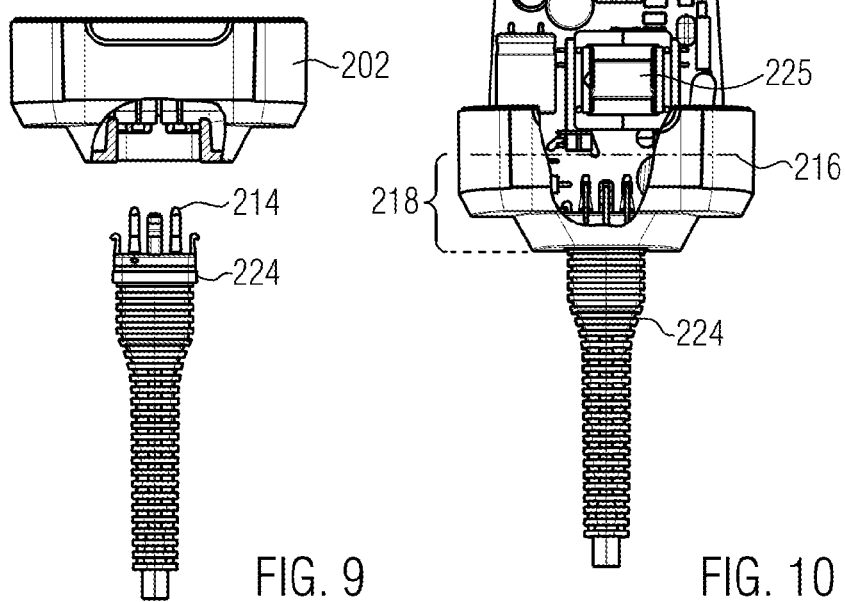
FIG. 8
FIG. 9
FIG. 10

PARTIALLY COMPOUND-FILLED POWER SUPPLY UNIT AND MANUFACTURING METHOD

BACKGROUND OF THE INVENTION

The present invention relates to a power supply unit for supplying a consumer with a low voltage, and specifically to a so-called plug-in power supply unit in which power plug pins are arranged directly in the device so as to hold the power supply unit in the power socket during use.

The present invention further relates to a manufacturing method for such a power supply unit.

SUMMARY OF THE INVENTION

Power supply units supplying a consumer with a low voltage by transforming the supply voltage into the necessary low voltage with the aid of a voltage transformer are nowadays widely spread. It is necessary for certain applications, e.g. for charging a shaver or an epilator, that the power supply unit can be safely operated in the moist atmosphere of a bathroom. Here, the protection class IPX4, or even IPX7 has to be observed.

As is generally known this so-called IP code (Ingress Protection or International Protection) relates to the protection against splashing water all-around (IPX4) and the protection against temporary submersion (IPX7) according to the Standard DIN EN 60529 [DIN EN 60529 (VDE 0470-1):2000-09 *Protection Classes by casings* (IP-Code) (IEC 60529:1989+ A1:1999); German Version EN 60529:1991+A1:2000. VDE-Verlag, Berlin].

In order to seal a casing in accordance with protection class IPX7 it is known, on the one hand, to arrange the power plug contact, the output lead and all components of the power supply unit in a casing and to fill this casing completely with an electrically insulating casting resin. An alternative to such a complete filling is the sealing of the casing by means of an ultrasonic welding seam. However, the ultrasonic welding alternative is not as process-reliable as the complete filling because the tightness depends on the quality of the welding seam and can be subject to certain unacceptable fluctuations.

Filling the plug-in power supply unit completely, on the other hand, has the disadvantage that the weight and the material expenditure are relatively high and, moreover, that the detection of causes of failure is rendered more difficult due to the fact that all of the components are inseparably enclosed by the casting resin.

Furthermore, it was realized by the inventors of the present application that the encapsulation of all of the components with a casting resin may lead to leakage currents between the electric components.

It is, therefore, the object of the present invention to provide a power supply unit and an associated manufacturing method allowing, on the one hand, the observance of a protection class that is suited for the operation in a moist area such as a bathroom and, on the other hand, the clear reduction of manufacturing costs and the complexity.

The present invention is based on the idea to provide a casing made of a casing base element and a lid element, wherein at least one power plug contact is held in the casing base element or in the lid element in such a way that it can be plugged into a power socket. According to the present invention the voltage transformer unit is mounted on a circuit carrier, which is arranged in the casing base element, in a plug-in direction of the power plug contact, in such a way that a defined first region of the circuit carrier, which is to be insulated, is received in a casting space that is enclosed by walls of the casing base element. The casting space of the casing base element is filled with an electrically insulating casting compound, so that the first region of the circuit carrier, which is to be insulated, is covered by the casting compound, while a second region of the circuit carrier, on which the at least one electronic component is arranged, is not encapsulated.

According to the manufacturing method according to the invention, moreover, the casing base element is filled with the casting compound up to the desired level first, and the circuit carrier is inserted subsequently.

The solution according to the invention affords the advantage, on the one hand, that in contrast to the complete filling clearly less casting compound is necessary so that, on the one hand, the cycle times for the manufacture of the charging units are decreased and, on the other hand, material costs and weight can be saved.

In addition, it has shown to be an advantage if the electronic components of a voltage transformer unit are not completely encapsulated with a casting resin because this can reduce or even entirely avoid leakage currents. However, there is no need for all components to remain without an encapsulation. It may also be advantageous to arrange certain components and connections within the casting space.

Moreover, the casting type according to the invention is advantageous in respect of a "Design for Testability" because the detection of causes of failure is substantially facilitated by the fact that the board is only partially encapsulated. Finally, after its service life is over, even the disposal of the inventive plug-in power supply unit can be facilitated because the components are not inseparably enclosed by the casting compound.

On the other hand, the casing according to the invention affords a secure sealing, e.g. according to the protection class IPX7, thereby allowing the use of the inventive power supply unit also in moist areas or outdoors.

Specifically, this efficient sealing can be obtained by arranging a connection area between the casing base element and the lid element in the casting space so that, in the fully mounted state, the connection area is sealed by the casting compound. This makes any other kind of welding or gluing redundant, and this very stable connection of the casing components allows the safe realization of tensile forces of 89 N or more.

For instance, the connection area can be formed by a snap-in connection, which is engaged as long as the casting compound has not yet hardened. Also, additional anchoring apertures may be provided in the connection area, into which the liquid casting compound penetrates so as to provide for a particularly reliable support in the hardened state.

Due to the fact that the casting compound is filled into the casing base element before the circuit carrier is mounted, a particularly simple and defined process management can be obtained. No complicated arrangements have to be made for the filling of narrow gaps, and air bubbles can be avoided effectively by inserting the board into the casting compound.

According to an advantageous embodiment of the present invention the electrical connection of the at least one power plug contact and/or the output lead to the board is realized by plug contacts which, in the fully mounted state, are arranged in the casting compound and are thereby electrically insulated. These contacts can be formed, for instance, by spring contacts which provide for an optimum electrical contact-making by means of a sliding movement as they are pushed on. As the casting compound is not yet hard at the time of mounting the circuit carrier, and if the spring contacts are arranged inside the casting space, undesired casting compound layers can be removed from the power plug pins and/or from the output leads in the required contact area by pushing on the spring contacts. Thus, a reliable contact-making is allowed. On the other hand, the power plug contacts or output leads and the associated spring contacts are mechanically fixed to each other on the circuit carrier by the casting compound in the fully mounted state, so that even strong tensile movements and vibrations are unable to influence the electrical contact-making.

According to another advantageous embodiment a holder may be provided for a strain relief of an output lead, which is arranged inside the casting space so that the strain relief, too, is sealed in a liquid-tight manner by the hardened material of the partial encapsulation.

BRIEF DESCRIPTION OF THE DRAWINGS

For the better understanding of the present invention, the invention is explained in more detail by means of the embodiments illustrated in the accompanying drawings, in which like components have like reference numbers and like component designations. Moreover, features or combinations of features from the illustrated and described different embodiments may represent independent and inventive solutions or solutions according to the invention. In the figures:

FIG. 3 shows a partially cut representation of the power supply unit of FIG. 2;

FIG. 4 shows a cut representation of the power supply unit of FIG. 2;

FIG. 5 shows a detail of FIG. 3;

FIG. 6 shows a detail of FIG. 4;

FIG. 7 shows a top view of the mounted switched-mode power supply unit of FIG. 2;

FIG. 8 shows a perspective view of a power supply unit according to another advantageous embodiment;

FIG. 9 shows an exploded, partially cut representation of the power supply unit of FIG. 8;

FIG. 10 shows a partially open representation of the casing base element with the board;

DETAILED DESCRIPTION

Figure 1:
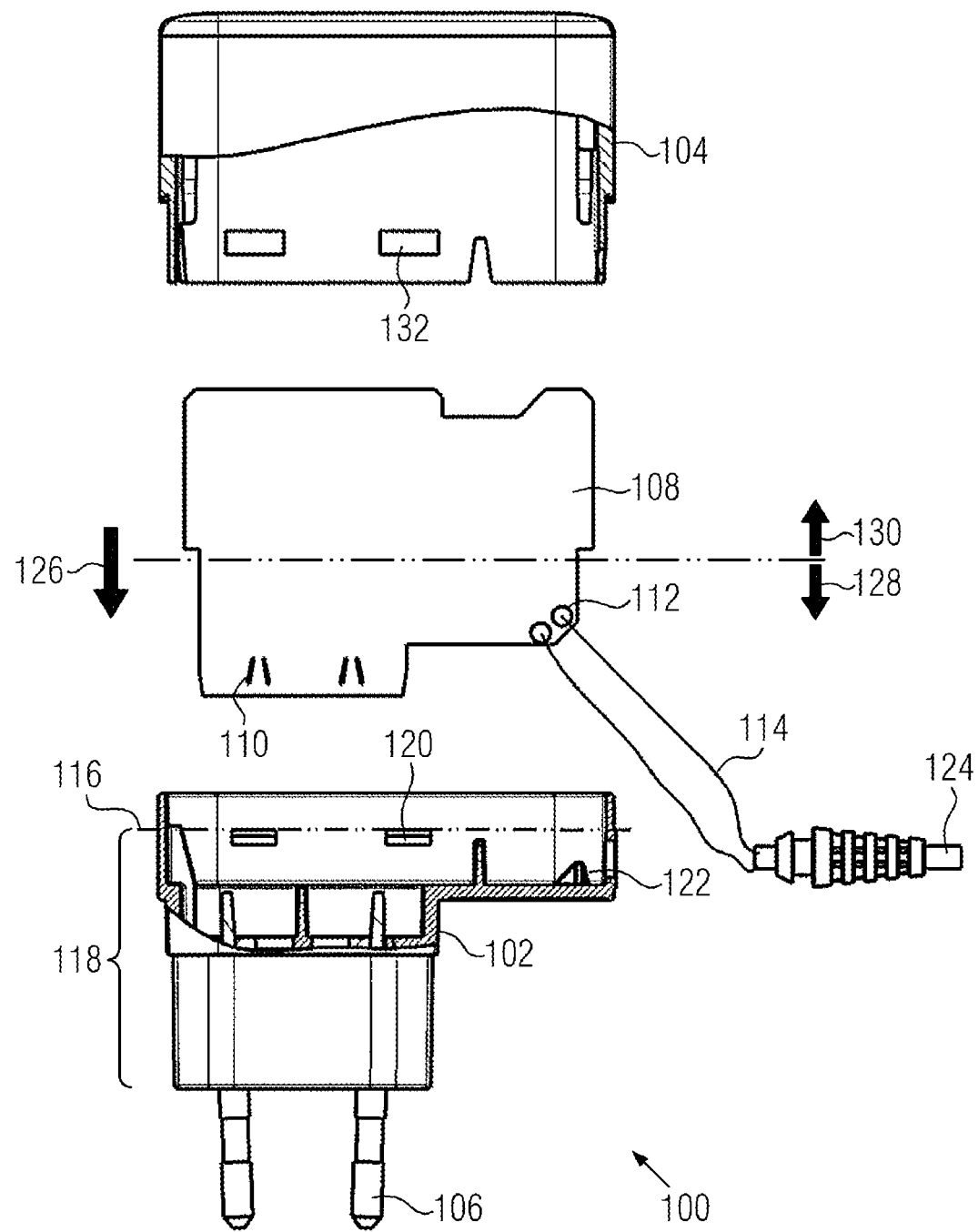
FIG. 1 shows an exploded, partially cut representation of a power supply unit according to a first embodiment.

The present invention will be explained in more detail below with reference to the figures. An exploded view of the inventive power supply unit 100 according to a first advantageous embodiment is outlined in FIG. 1. According to the invention the power supply unit for supplying a consumer with a low voltage comprises a casing base element 102 and a lid element 104 which, plugged together, form the casing of the power supply unit 100. According to this embodiment the power plug contacts 106 are arranged in the casing base element 102. In the illustrated embodiment a plug-in power supply unit 100 is shown, which complies with the standard of the European countries. Those skilled in the art will appreciate, however, that the power plug contacts 106 may also be realized in compliance with any other common national standards.

A circuit carrier 108, e.g. a printed circuit board, PCB, carries the necessary components for transforming the supply voltage into the necessary low voltage. For contacting the power plug contacts 106 the circuit carrier 108 comprises first contacts 110 which, in this case, are realized as pluggable spring contacts. These first contacts 110 are located on the primary side of the voltage transformer unit (for reasons of clarity not shown in the drawing) which is arranged on the circuit carrier 108. The second contacts 112 located on the secondary side serve the connection to the output lead 114.

According to the invention, for the purpose of mounting, the casing base element 102 with the power plug contacts 106 mounted therein is filled up to the filling mark 116. According to the present invention the casing base element 102 defines in that way a casting space 118 which is filled with a casting compound. The filling height may here be marked visually or be defined by the quantitatively controlled casting compound.

According to the first embodiment the leads for the power plug contacts 106, the snap-in noses 120 to be engaged with the lid element 104 as well as a holder and an aperture 122 for a strain relief 124 of the output lead 114 are located inside the casting space.

The printed circuit board 108, which is inserted into the casting space 118 in a direction 126 that runs substantially parallel to the plug-in direction of the power plug contacts 106 into a power socket, is divided into two regions: a first region 128 to be encapsulated, which is immersed in the casting compound and is arranged inside the casting space 118 of the casing base element 102 in the fully mounted state, and a second region 130 on which at least one electronic component is arranged and which remains without encapsulation.

According to the invention the connection between the output leads 114 and the second contacts 112 on the secondary side is established, for instance, by a soldered joint before the printed circuit board is mounted in the casing base element 102. In a first work step, the strain relief 124 is fixed in the holder 122.

As was mentioned before, the casing base element 102 is filled with a casting compound up to the mark 116 before the printed circuit board 108 is inserted in direction 126. By this, the power plug contacts 106 are electrically contacted by the first contacts 110 on the primary side. As the casting compound has not yet hardened at this time, it is displaced everywhere where this is necessary. In a final work step, the lid element 104 is now slid over circuit carrier 108 and is fixed with engagement apertures 132 at the snap-in noses 120. According to the invention the entire connection area of the snap-in connections 120, 132 is located underneath the filling mark 116, i.e. within the casting space 118, and the liquid casting compound fills any gaps and orifices of the connection area.

The hardening may be accelerated by means of a tempering step, and in the fully hardened state the connection between the casing base element 102 and the lid element 104 is sealed in a liquid-tight and reliable manner. Moreover, the strain relief 124 is fixed in the casing base element 102 in a reliable and sealed manner. Finally, the contacts 110 on the primary side as well as the contacts 112 on the secondary side are protected by the casting compound, while the region 130 of the circuit carrier 108 remains without encapsulation.

This arrangement allows the realization at least of protection class IPX7 according to DIN EN 60520 in a particularly simple and cost-efficient manner.

Due to the fact that the lid element 104 is mechanically fixed by means of the snap-in connection 120, 132 and is connected to the casing base element 102 by means of a material engagement after the casting resin has hardened, the arrangement is not only liquid-tight, but also mechanically very stable. As is shown in the perspective view of FIG. 2, the entire connection area 134 is sealed by a material engagement through the internal casting compound. Therefore, these connections cannot be separated, even if a user grasps the plug-in power supply unit in the gripping portion 136, and tensile forces, for instance, of 89 N or more can be reached without a problem.

Figure 2:
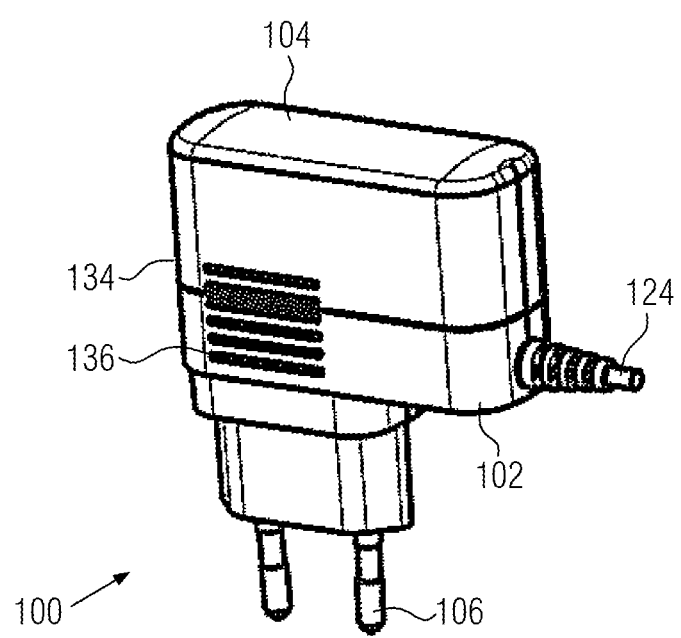
FIG. 2 shows a perspective representation of the fully mounted power supply unit according to the first embodiment.
Figure 11:
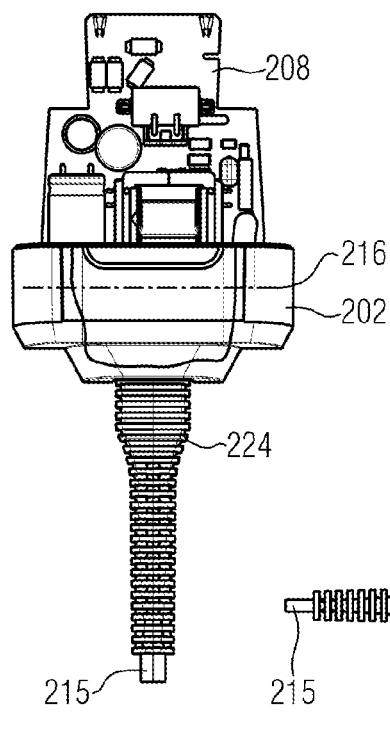
FIG. 11 shows a lateral representation of the base element prior to mounting the lid element.
Figure 12:
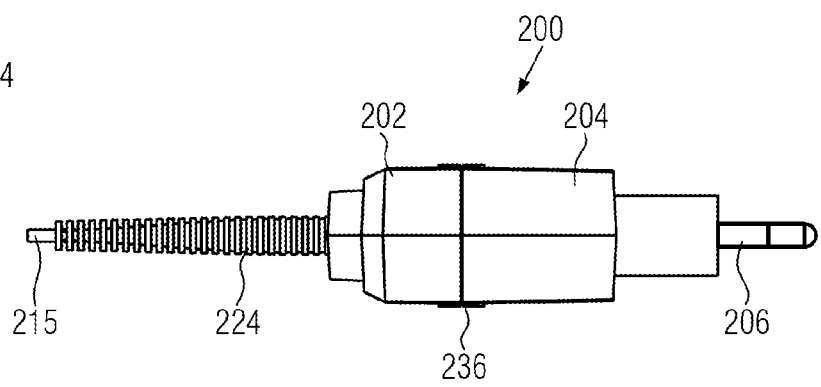
FIG. 12 shows a lateral view of the fully mounted plug-in power supply unit of FIG. 8.

FIGS. 3 to 7 show some partially cut detail aspects of the plug-in power supply unit 100 of FIGS. 1 and 2. As can be seen in FIG. 3 together with FIG. 5, the strain relief 124 is undercut and can be mounted in the casing base element 102 by means of insertion. Usefully, this is performed before the casting compound is filled in, so as to close the aperture and prevent the casting compound from flowing out of the casting space 118. In the fully mounted state the strain relief is supported both against the casing base element 102 and the lid element 104 and, moreover, is permanently secured by the casting compound.

FIG. 6 shows in a detailed view the snap-in connection between the casing base element 102 and the lid element 104. Of course, also differently configured snap-in connections may be provided between these two casing elements, as long as these can be fixed by means of the not yet hardened casting compound.

Below, the complete procedure for the production of the inventive power supply unit according to the first embodiment shall once more be explained in detail with reference to FIGS. 1 to 7.

In a first step, the necessary components and contacts are mounted on the circuit carrier 108. The contacts 110 on the primary side may be formed by pluggable spring contacts and the second contacts 112 on the secondary side may be formed by solder contacts. Of course, any other common connection techniques may be used as well, such as press-in contacts or crimp contacts.

a casing base element 102 is manufactured, for instance, by means of an injection molding process and, in the course thereof, provided with encapsulated power plug contacts 106. Of course, the power plug contacts 106 can be mounted on the casing base element 102 also in accordance with other known processes. Moreover, a lid element 104 is manufactured, preferably in another injection molding step. A strain relief 124 connected to output leads 114 is inserted into a corresponding aperture 122 of the casing base element 102, where it is mechanically fixed as a result of the undercut shape.

Now, the output leads 114, which may be realized as stranded wires, are soldered to the second contacts 114. Of course, also a plug contact may be provided at this place. According to the invention the casing base element 102 is now filled with an electrically insulating casting resin up to the filling height level 116. As long as the casting resin is still liquid the circuit carrier is now inserted into the casing base element 102 in direction 126, whereby the first contacts 110 on the primary side contact the power plug contacts 106.

Finally, the lid element 104 is placed on top, likewise in direction 126. As the snap-in noses 120 are located underneath the filling height level 116, the finally closed snap-in connection, too, is located inside the casting space 118. Liquid casting resin seals and fixes the closed snap-in connection between the casing base element 102 and the lid element 104. Moreover, also the connection to the strain relief 124 is protected and sealed by the filled in casting resin.

The hardening of the casting resin can be accelerated, for instance, by a tempering step. In the final mounted state the lid element 104 as well as the strain relief 124 are fixed by the snap-in connection and, after the casting resin has hardened, are simultaneously connected to the casing base element by a material engagement, and are thus completely sealed. Mechanical stability as well as a protection class adapted for the operation in moist areas can, in this way, be achieved in a particularly easy and effective manner.

As the board is only in part placed in the casting compound the electronic components located in region 130 are not encapsulated by the casting compound, and leakage currents can largely be avoided.

A second advantageous embodiment of a power supply unit 200 according to the present invention will be explained in more detail below with reference to FIGS. 8 to 12. The essential production steps and basic principles correspond to those of the first embodiment, so that the focus will hereinafter be on the differences over the first embodiment.

This plug-in power supply unit 200 substantially has the three-dimensional shape of a power plug because the power plug pins 206 and the output lead 215 substantially extend along a common longitudinal axis. This particularly narrow shape has the advantage of a greatest possible saving in space and facilitates the stowage and the transport of the plug-in power supply unit. The partial filling technique according to the invention, which will be explained in more detail below, affords the advantage, especially in this embodiment, that the connection of the two halves 202 and 204 of the casing has an extremely high loading capacity while, at the same time, the weight is as low as possible.

As can be seen in the exploded view of FIG. 9 the power plug pins 206 of the plug-in power supply unit 200 are not arranged on the casing base element 202, but on the lid element 204 opposite the secondary-side lead. In correspondence with the embodiment according to FIGS. 1 to 7 the casing base element 202 of the present embodiment is designed to define a casting space 218. The drawn in dash-dot line 216 indicates the filling height level. In addition to the necessary electronic components for the voltage transformation from a supply voltage to a low voltage the circuit carrier 208 comprises spring contacts 210, 212 for the insertion of the power plug pins 206 and for contacting the output leads 214, respectively.

The output leads 214 are arranged in a strain relief 224 which, according to the embodiment shown, is fixed to the casing base element 202 by a snap-in connection.

Analogous to the first embodiment, after mounting the output lead 224, 215 on the casing base element 202, again, the casting compound is filled in approximately up to line 216. Before the casting compound hardens, the circuit carrier 208 is inserted in direction 226 into the casing base element 202 in the next work step in such a way that the spring contacts 212 are electrically connected to the output leads 214. As can be seen in the representation of FIG. 10, a large part of the components 225 remains above the filling level 216 and, thus, outside the casting space 218. In this embodiment the leads 214 on the secondary side are arranged inside the casting space 218, however.

The final mounting step includes sliding on the lid element 204, which likewise has to be accomplished before the casting compound hardens in order to achieve a reliable sealing and a mechanically very stable connection between the casing base element 202 and the lid element 204. Apart from snap-in connections corresponding to the embodiment of FIGS. 1 to 7, anchoring apertures 233 may be arranged on the lid element of the second embodiment, into which the still liquid casting compound penetrates and, thus, forms mechanically stable anchors between the casing base element 202 and the lid element 204 after the hardening.

Moreover, as the lid element 204 is slid on, the electric contact between the spring contacts 210 and the power plug pins 206 is closed. The necessary contact protection and dielectric strength on this side of the plug-in power supply unit are guaranteed by the fact that the power plug pins are integrated in the lid element by encapsulation.

The gripping portion 236 allows a user to safely remove the plug-in power supply unit 200 from the socket.

Specifically this embodiment shows the improved mechanical stability in contrast to devices that are not compound-filled but, for instance, welded by means of ultrasound. Even if a user pulls against all usual recommendations at the output lead 215 in order to remove the plug-in power supply unit 200 from the socket, a destruction of the plug-in power supply unit by mechanical overstress is prevented by the fact that the snap-in connection of the strain relief 224 in the casing base element 202 is additionally fixed by the casting compound.

Although the output lead in the two embodiments shown is a low voltage lead it will be appreciated by those skilled in the art that any optional type of output leads may be arranged at the casing of the plug-in power supply unit. For instance, instead of the cable a USB (universal serial bus) connector and in particular a USB socket according to a USB Standard 1.0, 2.0 or 3.0 may be provided. Especially for charging mobile terminals such as mobile phones such a plug-in power supply unit is universally usable and, at the same time, mechanically stable and safe.

The invention claimed is:

1. A power supply unit for supplying a consumer with a low voltage, comprising:
    at least one power plug contact (106, 206) connectable to a supply voltage;
    at least one output lead (114, 214) for outputting the low voltage;
    a voltage transformer unit comprising at least one electronic component for transforming the supply voltage to the low voltage;
    wherein the power supply unit (100, 200) comprises a casing made of a casing base element (102, 202) and a lid element (102, 202), and wherein the at least one power plug contact (106, 206) is held in the casing base element (102) or in the lid element (204) in such a way that it can be plugged into a power socket,
    wherein the voltage transformer unit is mounted on a circuit carrier (108, 208), which is arranged in the casing base element (102, 202), in a plug-in direction (126) of the power plug contact (106), in such a way that a defined first region (128) of the circuit carrier (108, 208), which is to be insulated, is received in a casting space (118, 218) that is enclosed by walls of the casing base element (102, 202),
    and wherein the casting space (118, 218) of the casing base element (102) is filled with an electrically insulating casting compound, so that the first region (128) of the circuit carrier (108), which is to be insulated, is covered by the casting compound, while a second region (130) of the circuit carrier, on which the at least one electronic component is arranged, is not encapsulated.

2. The power supply unit according to claim 1, wherein first contacts (110) for electrically contacting the at least one power plug contact (106) are arranged in the first region (128) of the circuit carrier (108).

3. The power supply unit according to claim 2, wherein the at least one first contact (110) is connected to the at least one power plug contact (106) by a plug-type connection.

4. The power supply unit according to claim 1, wherein second contacts (112) for electrically contacting the at least one output lead (114) are arranged in the first region (128) of the circuit carrier (108).

5. The power supply unit according to claim 1, wherein a connection area (134) is arranged between the casing base element (102) and the lid element (104) in the casting space (118), so that the connection area is sealed by the casting compound in the fully mounted state.

6. The power supply unit according to claim 5, wherein a snap-in connection (120, 132) is provided in the connection area.

7. The power supply unit according to claim 1, wherein further a holder (122) for receiving a strain relief (124) for the output lead (114) is provided on the casing base element (102) in the area of the casting space (118).

8. A method for manufacturing a power supply unit for supplying a consumer with a low voltage, comprising the following steps:
    providing a casing base element and a lid element of a casing;
    arranging at least one power plug contact in the casing base element or the lid element, so that it can be plugged into a power socket;
    mounting a voltage transformer unit on a circuit carrier;
    filling an electrically insulating casting compound into a casting space enclosed by walls of the casing base element;
    mounting the circuit carrier comprising at least one electronic component in the casing base element in such an orientation with respect to a plug-in direction of the power plug contact that a defined first region of the circuit carrier, which is to be insulated, is received in the casting space, so that the first region of the circuit carrier, which is to be insulated, is covered by the casting compound, while a second region of the circuit carrier, on which the at least one electronic component is arranged, remains non-encapsulated;
    closing the casing by mounting the lid element.

9. The method according to claim 8, wherein at least a first contact for electrically contacting the at least one power plug contact is arranged in the first region of the circuit carrier and the contacting is accomplished by inserting the circuit carrier into the casing base element.

10. The method according to claim 8, wherein at least a second contact for electrically contacting the at least one output lead is arranged in the first region of the circuit carrier and the at least one output lead is connected to the second contact before the circuit carrier is inserted into the casing base element.

11. The method according to claim 10, wherein the at least one second contact is connected to the at least one output lead by a soldered joint.

12. The method according to claim 8, wherein a connection area is arranged between the casing base element and the lid element in the casting space, so that, in the fully mounted state, the connection area is sealed by the casting compound.

13. The method according to claim 12, wherein a snap-in connection is provided in the connection area.

14. The method according to claim 12, wherein the lid element is connected to the casing base element after the casting compound was filled in and before the casting compound has completely hardened.

15. The method according to claim 8 wherein further a holder for receiving a strain relief for the output lead is provided on the casing base element in the area of the casting space and the strain relief is mounted before the casting compound is filled in.

* * * * *